United States Patent [19]
Nadherny et al.

[11] Patent Number: 5,685,573
[45] Date of Patent: Nov. 11, 1997

[54] GLAD HAND ANTI-ROTATION DEVICE

[75] Inventors: Rudolph E. Nadherny, Golden, Mo.; Mark Kampf, Crystal Lake, Ill.

[73] Assignee: Ireco, Inc., Chicago, Ill.

[21] Appl. No.: 604,184

[22] Filed: Feb. 20, 1996

[51] Int. Cl.⁶ .................................................. F16L 35/00
[52] U.S. Cl. ............................ 285/24; 285/69; 285/253
[58] Field of Search .................................. 285/69, 71, 72, 285/76, 79, 82, 317, 305, 87, 319, 24, 252, 253

[56] References Cited

U.S. PATENT DOCUMENTS

| | | |
|---|---|---|
| 930,933 | 8/1909 | Brodie .............................. 285/71 |
| 3,879,066 | 4/1975 | Kozinski . |
| 3,892,431 | 7/1975 | Booth . |
| 3,941,254 | 3/1976 | Sweger . |
| 4,129,323 | 12/1978 | Wilson ............................. 285/69 |
| 5,388,864 | 2/1995 | Kozinski . |

Primary Examiner—Dave W. Arola
Attorney, Agent, or Firm—Lockwood, Alex, FitzGibbon & Cummings

[57] ABSTRACT

An anti-rotation device to be mounted on standard glad hands for rail cars for preventing unintended uncoupling of coupled glad hands. The device comprises a band assembly and a wire form. The band assembly is generally comparable to a hose clamp. As disclosed, the band assembly includes orienting features so that it will be circumferentially and axially oriented in an optimum position wherein damage to the band assembly due to a glad hand whipping against a car coupler upon uncoupling is minimized.

11 Claims, 3 Drawing Sheets

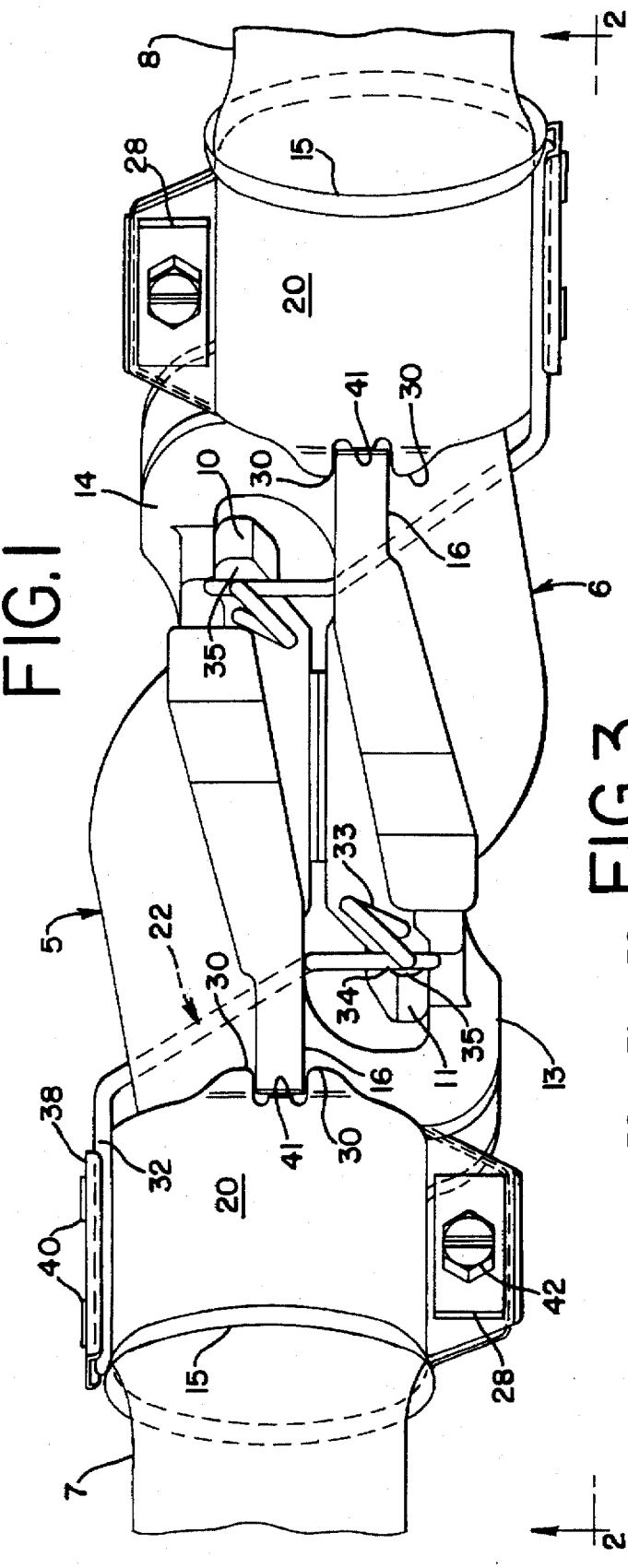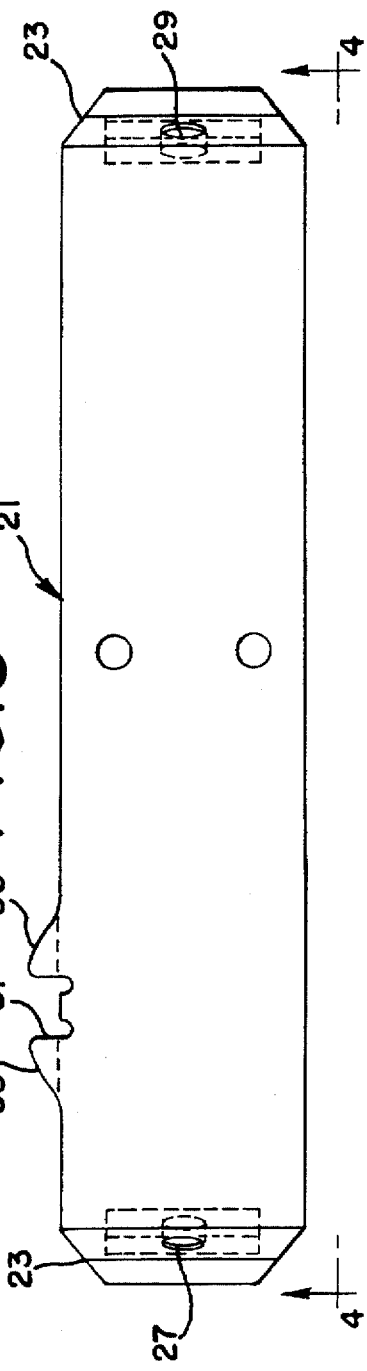

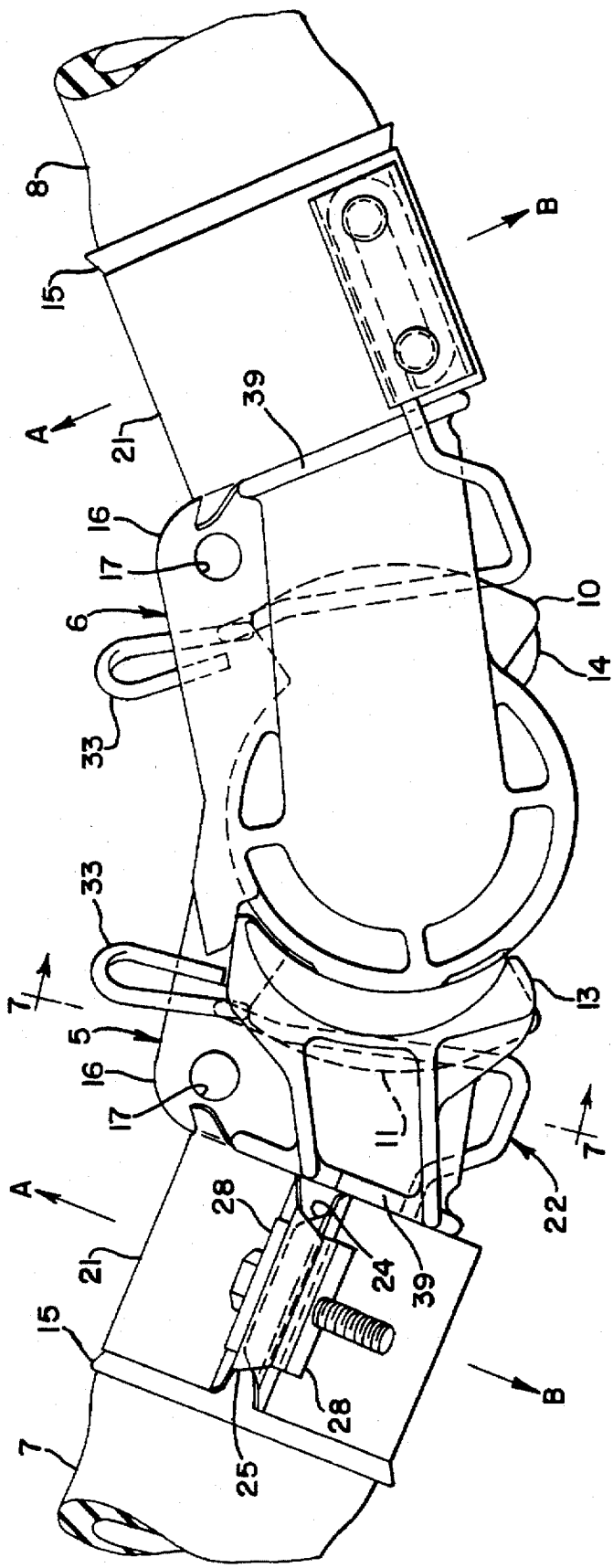

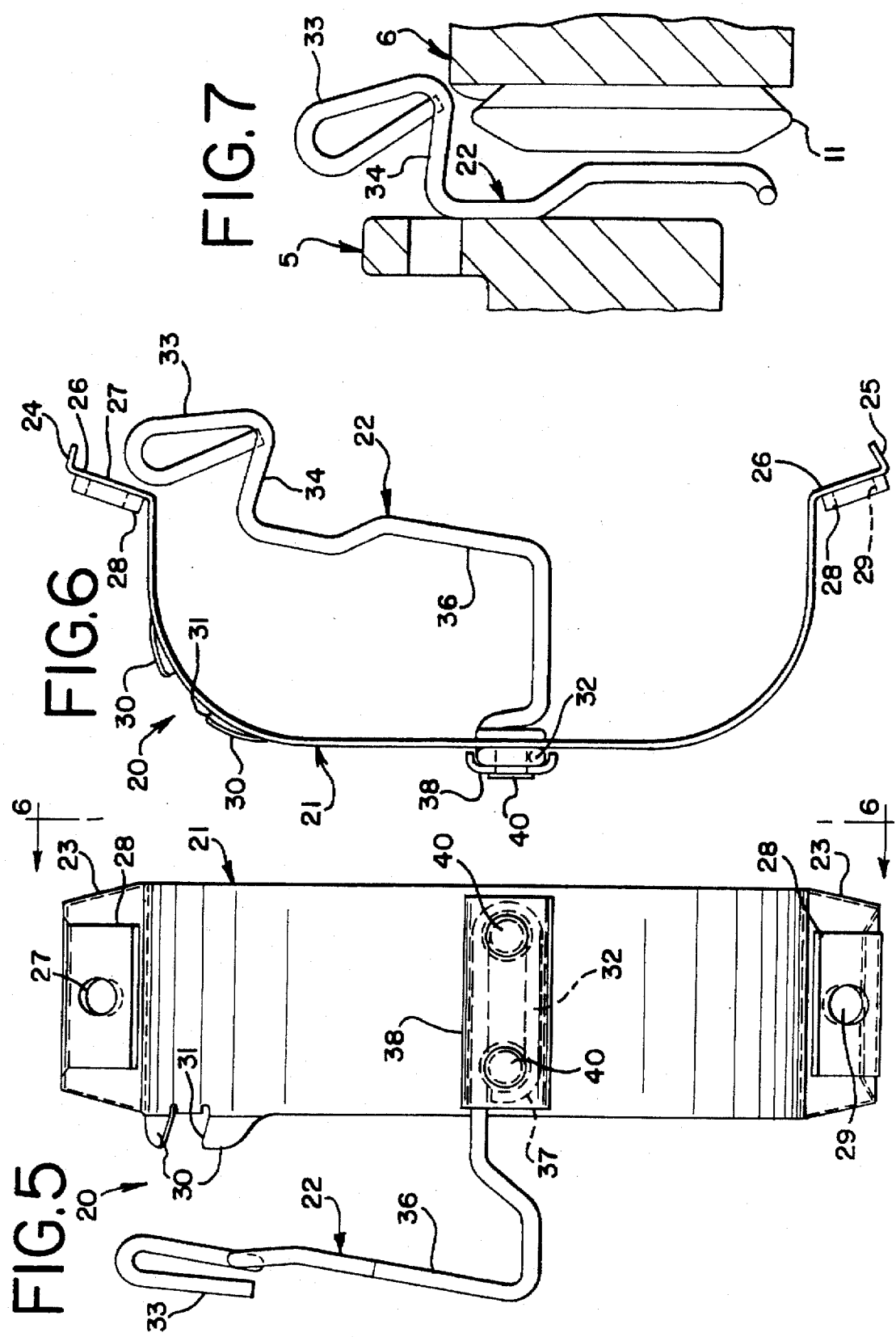

1

GLAD HAND ANTI-ROTATION DEVICE

BACKGROUND AND DESCRIPTION OF THE INVENTION

This invention relates to innovations and improvements in anti-rotation devices for use on railway car glad hands to prevent inadvertent rotation in an uncoupling direction of coupled glad hands.

Railway cars in the United States are provided on opposite ends with standardized couplers and so-called "glad hands" on the ends of the brake system air hoses. Such standardized couplers and standardized glad hands have existed for many years and were initially introduced so that trains could be made of any desired combination or mix of rail cars throughout the country's rail system.

Likewise, the air brake systems of rail cars have been and are standardized. In these systems, compressed air is used to disengage or release the brakes. If for any reason the air pressure fails or it is purposely vented, the brakes set automatically. The brake system is such that if the air pressure on any car in a train is released, the air pressure on all of the cars in the train is released and the brakes are set bringing the train to a stop. Accordingly, if the pair of coupled glad hands at the adjoining ends of any two rail cars in a train become uncoupled, the brakes on the train are automatically set.

The problem of coupled glad hands becoming inadvertently uncoupled as a result of being rotated in an uncoupling direction has long been recognized in the rail road industry, and various anti-rotation devices have been proposed as illustrated by a number of patents including U.S. Pat. Nos. 3,892,431 dated Jul. 1, 1975, 3,941,254 dated Mar. 2, 1976 and 5,388,864 dated Feb. 14, 1995 and various prior art patents mentioned therein. One of these three mentioned patents, namely, U.S. Pat. No. 3,941,254 that was assigned to the assignee of the present invention, discloses the use of a so-called "wire form" in anti-rotation means for coupled glad hands. The disclosure of U.S. Pat. No. 3,941,254 is hereby incorporated by reference in the present application.

SUMMARY OF THE INVENTION

The object of the present invention, generally stated, is the provision of improved anti-rotation means for preventing unintended relative rotation in an uncoupling direction between coupled rail car glad hands.

More specifically, the object of the present invention is to provide such anti-rotation means which is economical to produce, easy and convenient to apply, durable, and does not interfere with the normal operation in coupling a pair of glad hands or interfere with either the normal or the intentional uncoupling of the glad hands.

Certain other objects and advantages of the present invention will be apparent to those skilled in the art from the following detailed description of a presently preferred embodiment of the invention taken in conjunction with the accompanying drawings, wherein:

BRIEF DESCRIPTION OF THE DRAWINGS

FIG. 1 is a plan view showing two glad hands coupled together incorporating an anti-rotation device of the present invention;

FIG. 2 is a side elevation view taken on line 2—2 of FIG. 1;

FIG. 3 is a plan view of a strap with end formations which forms one part or element of the anti-rotation device of FIGS. 1 and 2;

FIG. 4 is a view taken on line 4—4 of FIG. 3;

FIG. 5 is an elevational view showing the anti-rotation device or means of the present invention;

FIG. 6 is an elevational view taken on lines 6—6 of FIG. 5; and

FIG. 7 is a fragmentary sectional view taken on lines 7—7 of FIG. 2.

Referring to the drawings, in FIG. 1 the upper of two coupled standard glad hands is indicated generally at 5 and the lower coupled glad hand is indicated generally at 6. The glad hands 5 and 6 are representative of glad hands that have long been in use as standard in the rail car industry. These glad hands meet the requirements of the Association of American Railroads so as to be compatible and interchangeable with other glad hands regardless of the manufacturer. The glad hand 5 is connected to the end of a rail car hose indicated at 7 while the glad hand 6 is connected to the end of a rail car hose indicated at 8. Extending from their distal ends, each of the glad hands 5 and 6 has a convex lip indicated at 10 and 11, respectively. Rearwardly, adjacent their proximal ends, the glad hands 5 and 6 have concave platforms indicated at 13 and 14 respectively. When the glad hands 5 and 6 are coupled as shown in FIGS. 1 and 2, the lip 10 mates with the platform 14 while the lip 11 mates with the platform 13 in well understood manner. In FIG. 2, the arrows A—A indicate the direction of rotation of the glad hands 5 and 6 when they are being coupled while the arrows B—B indicate the direction of rotation when they are being uncoupled.

On what may be considered their rearwardly extending ends, each of the glad hands 5 and 6 has an integrally formed nipple (not shown) the exterior of which has a series of alternate grooves and ridges. The ends of the rail car hoses 7 and 8 are telescoped over these nipples and secured in place by ferrules the rearward extending ends of which are outwardly flared as indicated at 15—15 (FIGS. 1 and 2).

Extending to one side, each of the glad hands 5 and 6 has a flange 16—16 provided with an aperture 17—17. The apertures 17 provides for the attachment of support chains or cables by which the glad hands 5 and 6 and the air hoses 7 and 8 attached thereto may be supported from the couplers (not shown) on their respective rail cars.

As thus far described, the construction and operation of the glad hands 5 and 6 are both conventional and standard in the prior art and well understood by persons skilled in the art. As mentioned above, and further elaborated on in the above identified patents, conditions are encountered in which fully coupled together glad hands such as 5 and 6 are inadvertently or accidentally rotated in an uncoupling direction as represented by the arrows B—B (FIG. 2). The embodiment of the invention now to be described in the connection with the drawings prevents unintended rotation of the glad hands 5 and 6 in the uncoupling direction while at the same time permits the glad hands to be pulled apart endwise in opposite axial directions as automatically normally happens when joined car couplers are disconnected, permitting coupled glad hands to be releasably uncoupled when desired.

The anti-rotation device of the present invention is indicated generally at 20—20 in FIGS. 5 and 6 in its manufactured condition and as shown installed in FIGS. 1 and 2. The assembled device 20 comprises a strap indicated generally at 21 and a wire form indicated generally 22. The opposite ends of the strap 21 are preferably tapered as indicated at 23 in FIGS. 3 and 5 and bent at an angle as shown in FIGS. 4 and 6 with the terminal ends 24 and 25 (FIG. 6) bent at sufficiently different angles so as to interfit when the strap is installed as shown in FIG. 2.

Each of the bent end portions 26—26 inwardly of the lips 24 and 25 are provided with apertures 27 and 29, respectively, and a relatively thick reinforcing piece 28—28 welded to the end portion 26. At least one of the apertures 27 or 29 is threaded so as to serve as a nut.

For purposes of orientation, as will be described, the strap 21 is provided on one edge with a pair of tabs or ears 30—30 providing therebetween a notch 31.

Each wire form 22 may be formed of heat treated stainless steel wire suitably formed and bent so as to have a proximal end 32 (FIGS. 5 and 6) and a manipulatable distal end 33 formed by bending the wire over on itself. Contiguous with the distal end 33 the wire form 22 has a section 34 (FIG. 6) which engages the surface 35 (FIG. 1) on the end of the lip 10 or 11 of the opposing glad hand.

Intermediate the section 34 (FIG. 6) and the anchored proximal end 32, the wire form 22 is bent into several sections so as to pass from the proximal end around one side of the glad hand and then inwardly to the opposite side underneath the glad hand so as to join the section 34. The sections between the proximal end 32 and the section 34 are indicated at 36 in FIGS. 5 and 6.

The proximal end 32 is formed by doubling the wire of the form 22 into a U-shape as shown in FIG. 5 with a hook 37 on the end. In order to anchor the proximal end 32 in place, a stamped cover plate 38 is placed over the proximal end and a pair of rivets 40—40 are passed through the cover and the strap 21. One of the rivets 40 is located inside the bight in the proximal end while the other is located inside the hook 37.

Each anti-rotation device 20 is installed on a glad hand 5 or 6 by forming the strap portion 21 around the ferrule on the end of the respective air hose 7 or 8 as shown in FIGS. 1 and 2. The band or strap 21 is oriented so that the notch 31 between the tabs 30—30 fits over the end 41 of the flange 16 on the glad hand. The ends 26 on the strap 21 are brought together so that the lip 25 fits inside the lip 24 and a fastener in the form of a bolt 42 is inserted and tightened in the registering holes 27 and 29 (FIGS. 5 and 6) one of which is internally threaded, preferably with lock threads.

When the lips 24 and 25 (FIG. 6) seat together, the installer knows that the bolt 42 is fully tightened. It will also be seen that the reinforcing pieces 28 reinforce the end portions 26 so as to prevent them from collapsing toward each other.

It will be noted that the width of each strap 21 is such that it fits between the flared end 15 on a ferrule and the shoulder 39 (FIG. 2) on each glad hand. Thus, between the interfitting of the notch 31 against the end 41 of the flange 16 and the trapping of the strap 21 between the flared end 15 and the shoulder 39, each anti-rotation device 20 with its wire form 22 is automatically oriented and secured in the proper location on the glad hand both circumferentially and axially.

There is another important reason for the anti-rotation device 20 being oriented so that the joined ends of the strap 21 are located on the same side of the glad hand as its platform 13 or 14, which is the side of the glad hand which mates with the lip 10 or 11 on the other glad hand to which it is coupled. As mentioned above, when one rail car is uncoupled from the end of another, the coupler therebetween is opened or released and the cars are allowed to separate. As the cars separate they automatically pull the coupled glad hands 5 and 6 apart. This results in the venting or release of the pressure within the air hoses through the openings in the glad hands. With the pressure being in the neighborhood of 90 psi this abrupt release usually causes the air hoses and glad hands to whip apart often striking against the coupler or other support member. However, it has been found that by having the joined ends 26—26 of the straps 21 located on the side of the coupler adjacent the platform 13 or 14, the danger of the joined ends striking against a coupler is practically eliminated. Otherwise, the means for fastening together the joined ends of the strap 21 could be either damaged but remain functional or even destroyed so that the anti-rotation device 20 would no longer be useful. In this connection, it has been found in tests that even if the cover plate 38 strikes against the coupler, as occasionally may happen, there is no resulting damage of any consequence.

What is claimed is:

1. For combination with a standardized glad hand on the end of a rail car air hose, anti-rotation means for preventing unintended relative rotation in an uncoupling direction between said glad hand and a second glad hand to which said first-mentioned glad hand is coupled, comprising, a band assembly circumferentially tightenable around the end of the rail car hose onto which said first-mentioned glad hand is connected and an anti-rotation wire form mounted on said band assembly, said band assembly comprising, a strap having a length so as to circumferentially embrace said end of the rail car hose and having end joining formations thereon, and fastener means for securing said end joining formations together so as to tighten said strap on said end of the rail car hose, said strap having orienting means co-operable with a part of said first-mentioned glad hand whereby said band assembly is oriented in a predetermined relationship with respect to said first-mentioned glad hand, and said anti-rotation wire form comprises, a proximal end anchored to said strap, a manually manipulatable distal end, a locking section adjacent said distal end for locking engagement with the juxtaposed end of the lip on said second glad hand to which said first-mentioned glad hand is coupled, and a connecting section joining said locking section and said proximal end.

2. The anti-rotation means of claim 1 wherein said orienting means is co-operable with said first-mentioned glad hand so as to orient said wire form for having its said locking engagement.

3. The anti-rotation means of claim 2 wherein said orienting means also orients said strap end formations and fastener means on the side of said first-mentioned glad hand which mates with said second glad hand.

4. The anti-rotation means of claim 2 wherein said orienting means comprises a notch which fits a projecting part on said first mentioned glad hand.

5. The anti-rotation means of claims 4 wherein said notch is formed between a pair of spaced tabs projecting from said strap.

6. For combination with a standardized glad hand on the end of a rail car air hose including a ferrule the circumferential end of which facing away from the glad hand is flared, anti-rotation means for preventing unintended relative rotation in an uncoupling direction between said glad hand and a second glad hand to which said first-mentioned glad hand is coupled, comprising, a band assembly circumferentially tightenable around said ferrule and an anti-rotation wire form mounted on said band assembly, said band assembly comprising, a strap having a width so as to fit in axially fixed relationship between said circumferential flared end and a shoulder on said first-mentioned glad hand with said width being approximately equal to the distance between said flared end and said shoulder, and said strap having a length sufficient to circumferentially embrace said ferrule and having joining end formations thereon, and fastener means for securing said end formations together so as to tighten said strap around said ferrule, and said anti-rotation wire form comprises, a proximal end anchored to said strap, a manually manipulatable distal end, a locking section adjacent said distal end for locking engagement with the juxtaposed end of the lip on said second glad hand to which said first-mentioned glad hand is coupled, and a connecting section joining said locking section and said proximal end.

7. The anti-rotation means of claim 6 wherein said strap has orienting means co-operable with a part of said first-mentioned glad hand whereby said band assembly is oriented in a predetermined circumferential relationship with respect to said first-mentioned glad hand.

8. The anti-rotation means of claim 7 wherein said orienting means is co-operable with said first-mentioned glad hand so as to orient said wire form for having its said locking engagement.

9. The anti-rotation means of claim 8 wherein said orienting means also orients said end formations and fastener means on the side of said first-mentioned glad hand which mates with said second glad hand.

10. The anti-rotation means of claim 8 wherein said orienting means comprises a notch which fits a projecting part on said first mentioned gland hand.

11. The anti-rotation means of claim 10 wherein said notch is formed between a pair of spaced tabs projecting from said strap.

* * * * *